US012632434B1

(12) United States Patent
Gracia-Tinedo et al.

(10) Patent No.: US 12,632,434 B1
(45) Date of Patent: May 19, 2026

(54) EXPLOITING CUSTOM EMBEDDINGS MODELS FOR OBJECT STORAGE DATA LAYOUTS

(71) Applicant: Dell Products L.P., Round Rock, TX (US)

(72) Inventors: Raúl Gracia-Tinedo, Barcelona (ES); Alan Lee Taylor, Cary, NC (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 19/037,046

(22) Filed: Jan. 24, 2025

(51) Int. Cl.
*G06F 16/27* (2019.01)
*G06F 16/22* (2019.01)
*G06F 21/62* (2013.01)

(52) U.S. Cl.
CPC .......... *G06F 16/2237* (2019.01); *G06F 16/27* (2019.01); *G06F 21/6218* (2013.01)

(58) Field of Classification Search
CPC .............................. G06F 16/227; G06F 16/27
See application file for complete search history.

(56) References Cited

U.S. PATENT DOCUMENTS

| | | | | |
|---|---|---|---|---|
| 2016/0314118 A1* | 10/2016 | Joshi | .................... | G06F 16/178 |
| 2023/0281181 A1* | 9/2023 | McHugh | ............. | G06F 16/1873 |
| | | | | 707/737 |
| 2024/0370580 A1* | 11/2024 | Verma | ................. | G06F 21/6227 |
| 2025/0209309 A1* | 6/2025 | Matamoros | ............ | G06V 20/70 |

OTHER PUBLICATIONS

Effi Ofer et al., Poster Applying Deep Learning to Object Store Caching, 2018, 1 page.
Gracia-Tinedo et al., Analysis of Data Availability in F2F Storage Systems: When Correlations Matter, 2012, 10 pages.
Gracia-Tinedo et al., Crystal Software-Defined Storage for Multi-Tenant Object Stores, This paper is included in the Proceedings of the 15th USENIX Conference on File and Storage Technologies, 2017, 15 pages.
Gracia-Tinedo et al., Dissecting UbuntuOne Autopsy of a Global-scale Personal Cloud Back-end, 2015, 13 pages.
Gracia-Tinedo et al., eWave: Leveraging Energy-Awareness for In-line Deduplication Clusters, 2014, 11 pages.
Gracia-Tinedo et al., IOStack Software-Defined Object Storage, 2016, 6 pages.

(Continued)

*Primary Examiner* — Khanh B Pham
(74) *Attorney, Agent, or Firm* — Chamberlain, Hrdlicka, White, Williams & Aughtry; Aly Z. Dossa

(57) ABSTRACT

Embodiments disclosed herein relate to object storage services employing an embeddings-based data layout using embedding vectors for data objects to be stored. Embedding vectors allow for data objects that are "similar" to be placed physically close (i.e., same server (storage node) or group of servers), based on a similarity metric with the embedding vectors. Further, the data layout is controlled by defined policies which specify the storage bucket, storage nodes included in the storage bucket and an embedding model to create the embedding vectors. The data policies are customizable by administrators of the storage system. In addition to data layout and embedding vectors, embodiments also relate to data replication that conforms with the data layout.

18 Claims, 5 Drawing Sheets

(56) References Cited

OTHER PUBLICATIONS

Lin Wu et al., BOSS An Efficient Data Distribution Strategy for Object Storage Systems With Hybrid Devices, IEEE Access Special Section on Emerging Trends, Issues, and Challenges in Energy-Efficient Cloud Computing, publication date Sep. 4, 2017, 15 pages.

Petros Daras et al., Similarity content search in content centric networks, Oct. 2010, 5 pages.

Philip Carns et al., Impact of Data Placement on Resilience in Large-Scale Object Storage Systems, 2016, 13 pages.

Ozgur D. Sahin, et al., Proceedings of The Second International Workshop On Databases, Information Systems and Peer-to-Peer Computing, 2004, 18 pages.

MongoDB Index Vector Embeddings, https://www.mongodb.com/docs/atlas/atlassearch/field-types/knn-vector/, Mar. 2024, 8 pages (Last accessed: Jan. 25, 2025).

PGVector, https://github.com/pgvector/pgvector, Mar. 2024, 22 pages (Last accessed: Jan. 25, 2025).

Lukas Rupprecht et al., SwiftAnalytics: Optimizing object storage for big data analytics. In 2017 IEEE International Conference on Cloud Engineering (IC2E), IEEE, 2017, 6 pages.

Jannatun Noor et al., Sherlock in OSS: A Novel Approach of Content Based Searching in Object Storage System., arXiv preprint arXiv:2303.02105, 2023, 16 pages.

Rajendra Shinde et al., Similarity search and locality sensitive hashing using ternary content addressable memories, Proceedings of the 2010 ACM SIGMOD International Conference on Management of data, 2010, 11 Pages.

* cited by examiner

EXPLOITING CUSTOM EMBEDDINGS MODELS FOR OBJECT STORAGE DATA LAYOUTS

BACKGROUND

Object storage services are becoming a universal storage solution for unstructured data including multimedia data (e.g., audio, images, video, etc.). The object storage services provide a scalable design for a system allowing for expansion of the throughput and capacity of data. Further, the object storage services use simple key/value semantics which can be integrated with a variety of applications. Normally, object storage services store data across storage nodes with a high level of dispersion. Data storage techniques like consistent hashing may be employed. These techniques cause a good load balancing of data across servers in the object storage services, while requiring a small state footprint.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example and are not meant to limit the scope of the claims.

DETAILED DESCRIPTION

Figure 1:
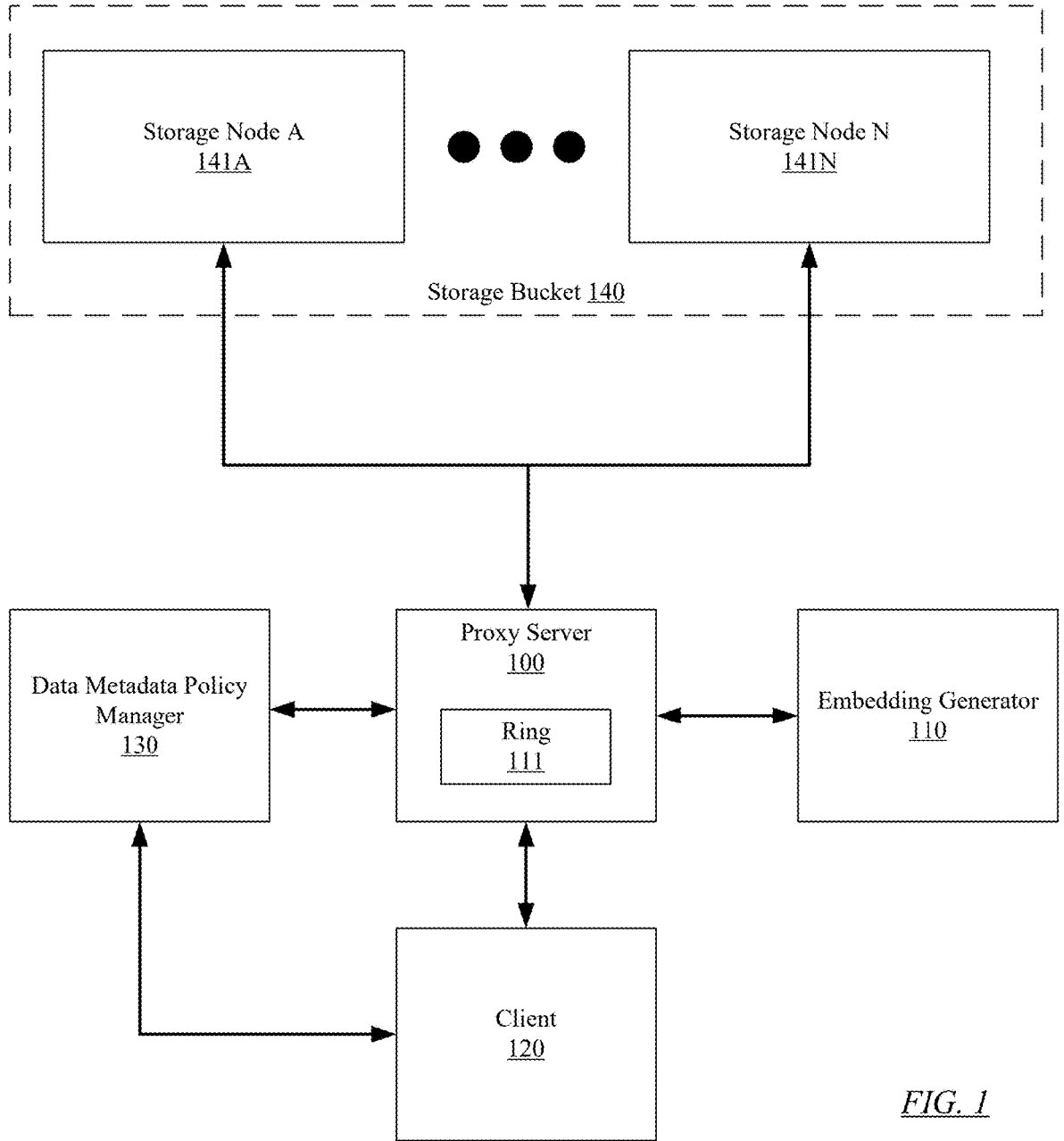
FIG. 1 shows a diagram of a system in accordance with one or more embodiments disclosed herein.

In traditional object storage services consistent hashing may be employed to store data across servers in the object storage services. The consistent hashing causes a good load balancing of data across the servers in the object storage services, while requiring a small state footprint (e.g., less physical storage space). However, these techniques distribute data in a virtually random way across the servers. This inherently gives administrators of system employing object storage servers little or no control over the exact distribution of data across the servers. For a multitude of use cases, administrators' ability to define data layout in object storage services would be beneficial including enhancing privacy and energy efficiency. For privacy, even if servers in the system have different levels of security, due to the random dispersal of the data, there is no way to store certain data at different levels of privacy. Therefore, the ability to store mixed data sets with data requiring privacy and data that does not require privacy is not possible with traditional object storage services, or all of the data must be stored using the strictest privacy standards. For energy efficiency, after data is stored on the system, due to the random dispersal of the data, all servers are activated when data is read from the system. Therefore, the ability to strategically store data on specific servers can reduce energy consumption when reading data from the system by activating fewer servers.

For at least the reasons discussed above, a different approach/framework may be beneficial for storing data on object storage services.

Embodiments disclosed herein relate to object storage services (storage system) employing an embeddings-based data layout using embedding vectors for data to be stored. Embedding vectors allow for data objects that are "similar" to be placed physically close (i.e., same server (storage node) or group of servers), based on a similarity metric associated with the embedding vectors. The data layout is fine grained and can be changed across storage buckets. Further, the data layout is controlled by defined policies which specify the storage bucket, storage nodes included in the storage bucket and an embedding model to create the embedding vectors. The defined policies are customizable by administrators of the storage system to balance load balancing and reliability concerns with the goals of the defined polices. In addition to data layout and embedding vectors, embodiments also relate to data replication that conforms with the data layout. Two use cases include for privacy and energy efficiency. Starting with privacy, a privacy-aware data layout may store data objects with sensitive content in a specific set of servers with higher security measures and non-sensitive content in servers with lower security measures. Turning to energy efficiency, an energy-efficiency data layout may aim to prevent all the servers within an object storage cluster to be activated under low to moderate workloads of similar files (e.g., AI training data loading, similar content search, etc.), enabling at least some servers to remain in a power savings mode.

The following describes various embodiments disclosed herein.

FIG. 1 shows a diagram of a system in accordance with one or more embodiments disclosed herein. The system includes a proxy server (100), an embedding generator (110), a client (120), a data metadata policy manager (130), and a storage bucket (140). The system is used to store, retrieve, and delete data from the storage bucket (140) and is an object storage service. The proxy server (100) is connected to the embedding generator (110), the client (120), the data metadata policy manager (130), and storage nodes of the storage bucket (140). The data metadata policy manager (130) may also be connected to the client (120).

The system may include additional, fewer, and/or different components without departing from the scope of the embodiments disclosed herein. Each component may be operably/operatively connected to any of the other components via any combination of wired and/or wireless connections (including connections to local area networks, wireless networks, and wide area networks). For example, the components shown in FIG. 1 may be connected via a network fabric (not shown). A network fabric refers to the interconnected topology and structure of network elements, e.g., switches, routers, and links, which work together to provide data transmission within between the components. The network fabric may be implemented using a spine-leaf topology, where every leaf switch connects to each spine switch. Those skilled in the art will appreciate that any other type of network (or network topology) may be used without departing from the disclosure.

Each of these components shown in FIG. 1 is described below.

In one or more embodiments, the proxy server (100) is an entry point for data requests by the client (120) to the storage bucket (140). The data requests include requests for storing, retrieving, and managing data and associated metadata. The proxy server (100) performs authentication and authorization of the data requests. The proxy server (100) routes the requests to the embedding generator (110) and routes the data request to the correct storage nodes after receiving an embedding in response from the embedding generator (110). The requests may include "PUT" (i.e., write requests), "GET" (i.e., read requests), "DELETE" (i.e., remove the data from storage requests), etc. In one or more embodiments, the proxy server (100) includes a ring (111) that is configured to manage the placement and retrieval of objects across storage nodes. The ring (111) maintains a mapping of data objects that are in the storage nodes and where replicas of the data objects are stored. In one or more embodiments, the ring (111) accomplishes this mapping by associating object names or keys with the data objects and further associates physical locations, such as partitions of storage nodes, with the data objects to locate the replicas of the data objects. The ring (111) allows the system to scale horizontally by adding more storage nodes to the storage bucket (140) without impacting performance because it can add the mappings of new storage nodes. The ring (111) may be used in part with the methods described in FIGS. 2-3.

Figure 5:
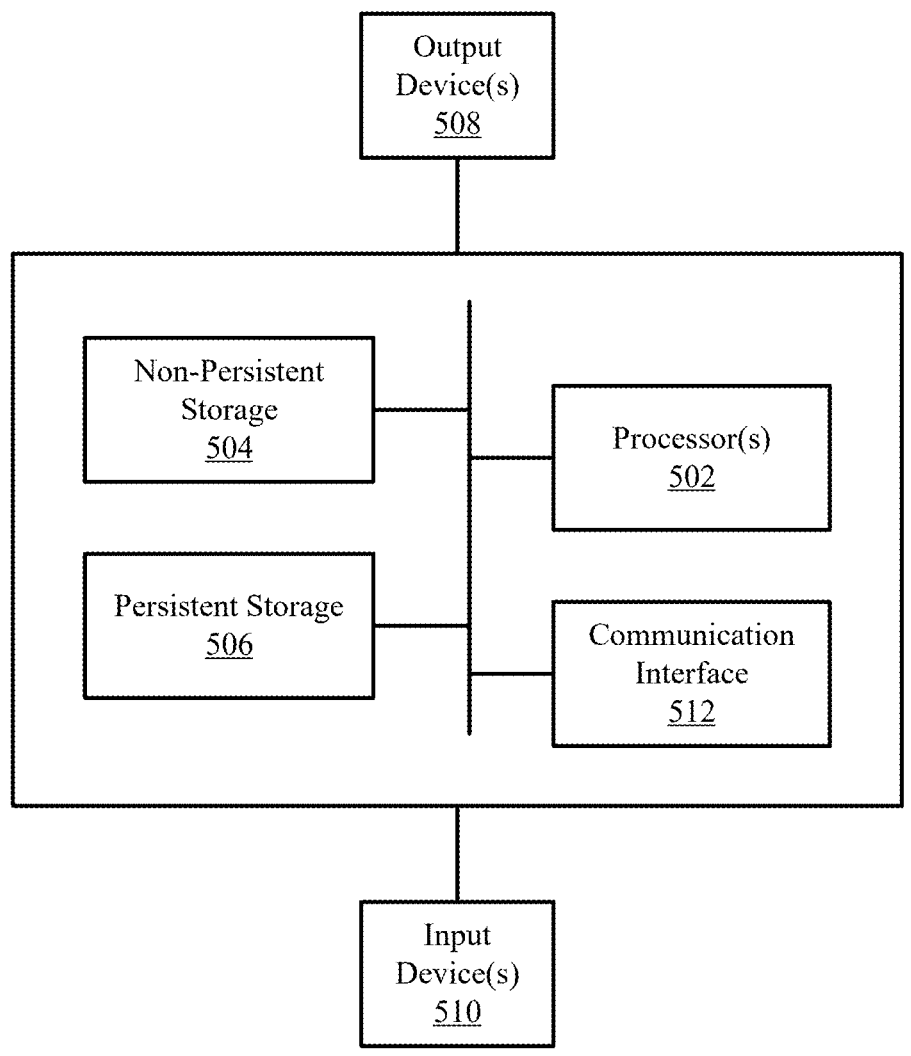
FIG. 5 shows a diagram of a computing device in accordance with one or more embodiments disclosed herein.

In one or more embodiments, the proxy server (100) is implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the proxy server (100) described throughout this application and/or all, or a portion thereof, of the methods illustrated in FIGS. 2-3.

In one or more embodiments, the proxy server (100) is implemented as a logical device(s) (e.g., a virtual machine). Each logical device may utilize the computing resources of any number of computing devices and thereby provide the functionality of the proxy server (100) described throughout this application and/or all, or a portion thereof, of the methods illustrated in FIGS. 2-3.

In one or more embodiments, the embedding generator (110) is configured to create embedding vectors for data objects. Embedding vectors are mathematical representations of data that capture data's semantic or contextual relationships in a lower-dimensional space. Embedding vectors encode meaningful features of the data in a vector space, where similar items are mapped close together, and dissimilar items are mapped far apart. The embedding vectors can be used in representing the content in a format that is conducive to efficient similarity computation and retrieval using content-based search.

In one or more embodiments, the embedding generator (110) hosts multiple embedding models to form embedding vectors. For text-based data objects, models employ word embeddings (e.g., Word2Vec, GloVe) and sentence embeddings (e.g., Universal Sentence Encoder) to convert words or sentences into high-dimensional vectors to capture semantic relationships between content of the text-based data objects. For multimedia data objects (e.g., images, audio, video, etc.) the embedding models may be deep learning models including convolutional neural networks (CNNs) and recurrent neural networks (RNNs) to generate embeddings that encode visual or auditory features of the multimedia data objects. The embedding models utilize artificial intelligence (AI) using the data object as an input to create an embedding vector as an output. Selection of the embedding models is discussed in FIG. 2.

Returning to the embedding vectors, content-based search applications can perform a similarity search using similarity metric such as cosine similarity or Euclidean distance to retrieve items that are most similar to a given query. The proxy server can use a content-based search application to store data objects in a correct location based on the embedding vector as described in FIG. 2.

In one or more embodiments, the embedding generator (110) is separate from the proxy server (100) and storage bucket (140). In such a structure, the embedding models are executed in-line in the separate infrastructure of the embedding generator (110). This allows embeddings vector creation to be scaled out independently from the storage infrastructure. The embedding generator (110) allows for the flexibility to apply custom and specialized embeddings models to data objects, allowing for a multitude of use cases as described in FIGS. 2-4.

In one or more embodiments, the embedding generator (110) may be implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the embedding generator (110) described throughout this application and/or all, or a portion thereof, of the methods illustrated in FIGS. 2-3.

In one or more embodiments, the embedding generator (110) is implemented as a logical device(s). Each logical device may utilize the computing resources of any number of computing devices and thereby provide the functionality of the embedding generator (110) described throughout this application and/or all, or a portion thereof, of the methods illustrated in FIGS. 2-3.

In one or more embodiments, the client (120) is an interface for a customer or user of the system to request data objects be stored, retrieved, deleted from the object storage service (e.g., storage bucket (140)), etc. The client (120) transmits data object requests to the proxy server (100). The data object request includes the storage bucket (140) to which the data is to be stored or retrieved. In one or more embodiments, the client (120) is used by an administrator to update defined policies stored on the data metadata policy manager (130).

In one or more embodiments, the client (120) is implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the client (120) described throughout this application and/or all, or a portion thereof, of the methods illustrated in FIGS. 2-3.

In one or more embodiments, the client (120) is implemented as a logical device(s). Each logical device may utilize the computing resources of any number of computing devices and thereby provide the functionality of the client (120) described throughout this application and/or all, or a portion thereof, of the methods illustrated in FIGS. 2-3.

In one or more embodiments, the data metadata policy manager (130) stores the defined data policies. The defined policy allows administrators to define data layout policies for associating a specific embeddings model to the storage bucket (140). Policies are defined in a flexible and simple way defining the storage bucket to store data objects, the embedding model to use on the data objects, and the storage nodes associated with the storage bucket and any layout the storage nodes have. The defined policy is further described in FIG. 2. The proxy server checks the data layout policy metadata to pick the right embedding model.

In one or more embodiments, the data metadata policy manager (130) may be implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the data metadata policy manager (130) described throughout this application and/or all, or a portion thereof, of the methods illustrated in FIGS. 2-3.

In one or more embodiments, the data metadata policy manager (130) is implemented as a logical device(s). Each logical device may utilize the computing resources of any number of computing devices and thereby provide the functionality of the data metadata policy manager (130) described throughout this application and/or all, or a portion thereof, of the methods illustrated in FIGS. 2-3.

Figure 2:
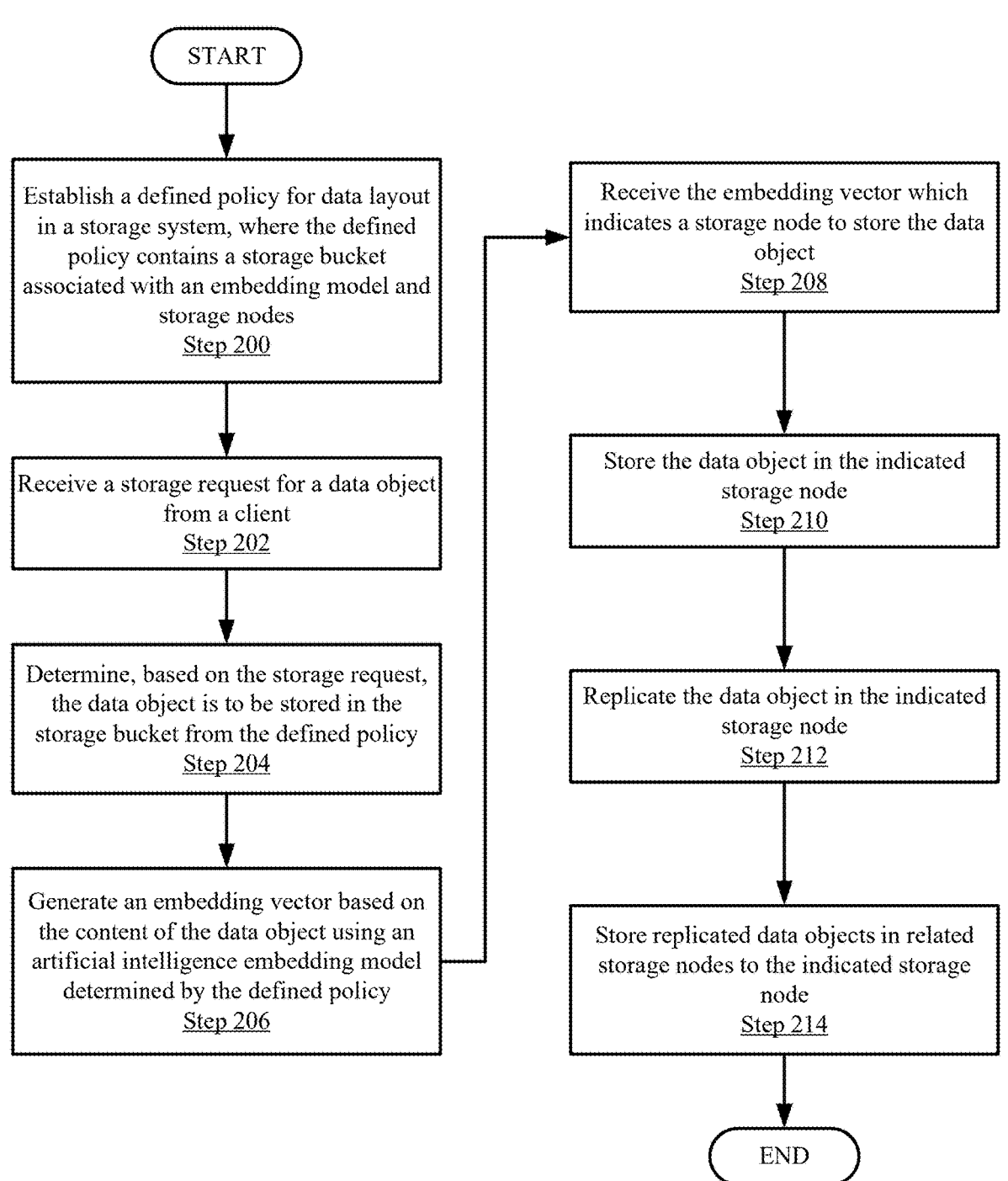
FIG. 2 shows a flowchart for a method for storing data in accordance one or more embodiments disclosed herein.
Figure 3:
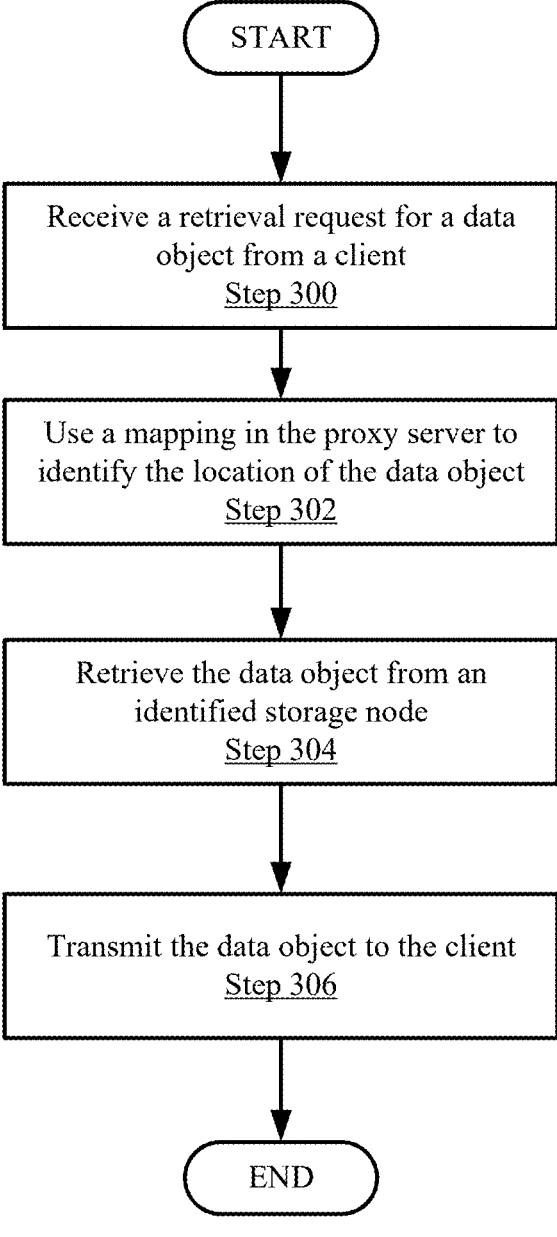
FIG. 3 shows a flowchart for a method for retrieving data in accordance one or more embodiments disclosed herein.
Figure 4:
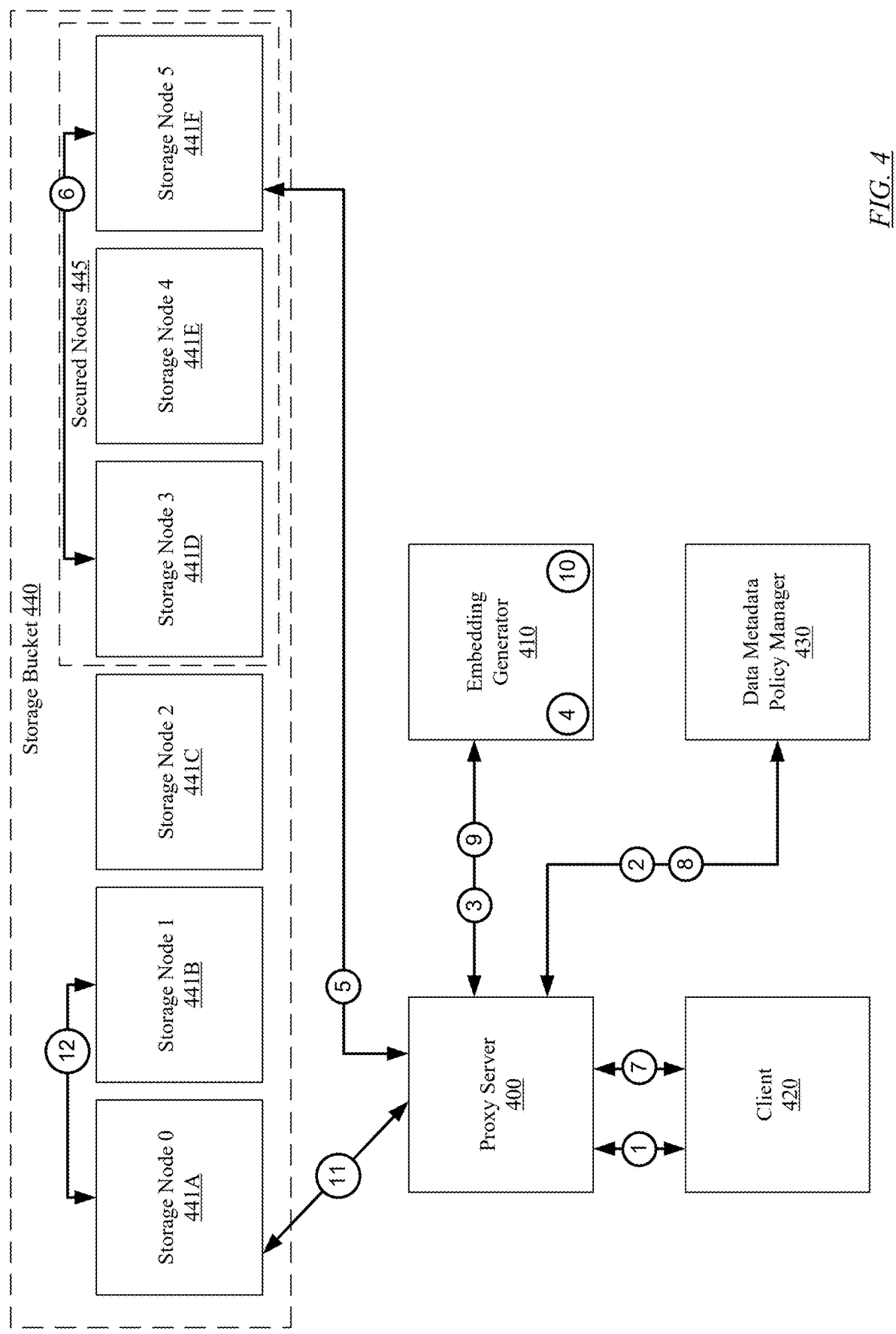
FIG. 4 show an example use case of a system for storing data in accordance with one or more embodiments disclosed herein.

In one or more embodiments, the storage bucket (140) is where data objects are stored in the object storage service. In one or more embodiments, the storage bucket may be one of a plurality of storage buckets (not shown) where each storage bucket is designed for a particular data layout that has a particular defined policy. This allows the system to handle the storage of different sets of data for different use cases. The storage buckets include a plurality of storage nodes (141A, 141N). The plurality of storage nodes may include storage node A (141A), storage node N (141N) and any other number of storage nodes. The storage nodes are responsible for storing and managing the data objects. The storage nodes store the data objects as immutable objects and distribute replicas across multiple other storage nodes for redundancy and fault tolerance. To store the data objects, each storage node (e.g., storage node A (141A)) typically consists of local disk storage and runs a service responsible for managing data object storage operations. As shown in FIGS. 2-4, the storage nodes may be arranged in various grouping and structures to align with the defined policy and data layout of the user.

In one or more embodiments, the storage bucket (140) is implemented as one or more computing devices (see e.g., FIG. 5). The computing device(s) may be, for example, a server, a distributed computing system, or a cloud resource. The computing device may include one or more processors, memory (e.g., random access memory), and persistent storage (e.g., disk drives, solid state drives, etc.). The computing device may provide the functionality of the storage bucket (140) described throughout this application and/or all, or a portion thereof, of the methods illustrated in FIGS. 2-3.

In one or more embodiments, the storage bucket (140) is implemented as a logical device(s). Each logical device may utilize the computing resources of any number of computing devices and thereby provide the functionality of the storage bucket (140) described throughout this application and/or all, or a portion thereof, of the methods illustrated in FIGS. 2-3.

Turning now to FIG. 2, FIG. 2 shows a flowchart for a method for storing data in accordance one or more embodiments disclosed herein. The method of FIG. 2 may be performed by, for example, the proxy server (e.g., 100, FIG.

1), and the embedding generator (e.g., 110, FIG. 1). Other components of the system of FIG. 1 may perform all, or a portion, of the method of FIG. 2 without departing from the disclosure.

While the various steps in the flowcharts of FIGS. 2-3 are presented and described sequentially, one of ordinary skill in the relevant art will appreciate that some or all of the steps may be executed in different orders, may be combined, or omitted, and some or all steps may be executed in parallel.

In Step 200, an administrator establishes a defined policy for data layout in a storage system. The defined policy may be stored on a data metadata policy manager (e.g., 130, FIG. 1). The defined policy identifies at least one storage bucket and associates an embedding model for each storage bucket and further associates a set of storage nodes with each storage bucket. The at least one storage bucket makes up an object storage service of the system. The defined policy may be written as "FOR STORAGE BUCKET b1 EMBEDDINGS_GENERATOR E1 STORAGE_NODES [s0 . . . sN]" where there are a multitude of storage buckets designed for different data layouts. In the above example policy, E1 identifies the embedding model to be used for data objects to be stored in the storage bucket b1. The storage nodes in the storage bucket b1 are identified as s0 to sN where N is an integer. The embedding model is designed to create embedding vectors for data objects that determine which storage node to store each data object.

In a first example, the defined policy is for storing a data set that includes two types of data objects (e.g., private data and non-private data). The defined policy identifies the storage bucket. The storage bucket includes a first set of storage nodes having storage nodes with specialized hardware (e.g., servers with specialized security hardware) and a second set of storage nodes having storage nodes without specialized hardware (e.g., servers without specialized security hardware). An embedding model is identified to create embedding vectors for data objects of the two types, a first one for the set having specialized hardware and a second one for the set having no specialized hardware. The embedding vectors are used by the proxy server to determine if the data object is a first type of data that should be stored in the first set of storage nodes or a second type of data that should be stored in the second set of storage nodes. One goal of this data layout strategy is discussed in FIG. 4.

In a second example, the defined policy is for storing similar data objects together to increase energy efficiency when retrieving data stored in the storage bucket. The defined policy identifies the storage bucket. The storage bucket includes sets of storage nodes defined by the policy to store data object that are likely to be retrieved at the same time together. An embedding model is identified to create embedding vectors for data objects to group the data objects based on shared content. The embedding vectors are used by the proxy server to determine in which set of storage nodes a data object should be stored.

In a non-limiting example, a storage bucket is used for storing images from surgeries in which the images include images of livers and images of eyes. In such an example, a first set of storage nodes is used to store the images of livers and a second set of storage nodes is used to store the images of the eyes. The embedding model is trained to create embedding vectors identify a data object as an image of a liver or an image of an eye. A goal for this strategy is energy conservation/efficiency in the storage bucket due to data objects that are likely to be retrieved at the same time are stored together to reduce the activation of storage nodes during retrieval.

In Step 202, the proxy server receives a storage request for a data object from a client. The client may be a client (e.g., 120, FIG. 1) as described above. The storage request includes the storage bucket and the data object to be stored in the storage bucket. Returning to the first example in Step 200, the storage request may be for a data object from the data set that includes two types of data objects. Returning to the first example in Step 200, the storage request may be for a data object to be stored with similar data objects.

In Step 204, the proxy server determines, based on the storage request, that the data object is to be stored in the storage bucket from the defined policy. The proxy server communicates with the data metadata policy manager (e.g., 130, FIG. 1) to determine if the storage request is governed by the defined policy. The storage request identifies the data object is to be stored in the storage bucket, therefore the data object is associated with the defined policy.

In Step 206, the embedding generator generates an embedding vector based on the content of the data object using an AI embedding model. The AI embedding model is defined by the defined policy. The proxy server transmits the storage request and the defined policy to the embedding generator. The embedding generator executes the AI embedding model to generate an embedding vector for the data object. The data object is used as an input for the embedding model to generate the embedding vector. The embedding vector is transmitted to the proxy server.

Returning to the first example in Step 200, the content of the data object may indicate that the data object should be stored in the first set of storage nodes, or the content of the data object may indicate a second type of data that should be stored in the second set of storage nodes. The embedding vector will include the context provided by the content of the data object.

Returning to the second example in Step 200, the content of the data object indicates which set of storage nodes the data object should be stored. The embedding vector will include the context provided by the content of the data object. The content of the data object is an image of a liver, and the embedding vector indicates that a liver is present in the data object.

In Step 208, the proxy server receives the embedding vector from the embedding generator. The embedding vector indicates where to store the data object, which can include a storage node or group of storage nodes. In one or more embodiments, the proxy server performs a similarity metric on the embedding vector. The defined policy indicates that the vector ID space used by the embedding vectors is partitioned across the available storage nodes. In one or more embodiments, the vector ID space assigns partitions directly to storage nodes. In one or more embodiments, the vector ID space has sub-clusters (sets of storage nodes) to which data objects are routed. Therefore, the data object will be stored in the storage node based on the content of the data object.

Returning to the first example in Step 200, the data layout of the storage bucket is based on sub-clusters (the first set of storage nodes and the second set of storage nodes). The data layout logic will get the embedding representing the input data object. The proxy server with perform a similarity search with the collection of precomputed embeddings that represent images that should be included in the first set of storage nodes. If the embedding vector of the data object is similar enough to any of the precomputed set of embeddings, the data object will be routed to the first set of storage nodes. If not, the data object will be stored in the second set of storage nodes. Within each of the sub-clusters, the data object can be stored in a particular storage node with consistent hashing using the ring (e.g., 111, FIG. 1). In one or more embodiments, each sub-cluster is independent. For example, if a sub-cluster lacks sufficient space to handle the storage request, an error message is propagated back to the client.

Returning to the second example in Step 200, data layout of the storage bucket may be based on sub-clusters or individual storage nodes. The proxy server may perform a similarity search with a collection of precomputed embeddings that represent images that refer to each sub-cluster or individual storage node. If an embedding vector of the data object is above a threshold level of similarity to any of the precomputed set of embeddings, the data object will be routed to the corresponding sub-cluster or individual storage node. Continuing with the above example regarding medical images, the embedding vector indicates that the data object includes a liver. The proxy server performs a similarly search that determines the embedding vector is above a threshold level of similarity to a precomputed set of embeddings of images of livers. The proxy server then determines that the data object should be stored in the storage node containing images of livers.

In Step 210, the proxy server stores the data object in the indicated storage node. The data object is stored in the storage node or set of storage nodes indicated in Step 208. If the data object is to be stored in a set of storage nodes, consistent hashing is used by the ring in the proxy server to store the data object in a particular storage node of the set of storage nodes. Consistent hashing allows for load balancing in the set of storage nodes. A mapping of the data object in the correct storage node is stored in the proxy server to allow for retrieval of the data object. In one or more embodiments, the mapping is created by using the embedding vector for the data object.

In Step 212, the indicated storage node replicates the data object. The data object is replicated for durability, backup, and availability purposes. The replication of the data object corresponds with the custom data layout should be aligned with the goal of the data layout. The object replication strategy is tailored to the data layout. The storage node where the data object is located handles the replication and creates copies of the data object. In one or more embodiments, the timing of the data object replication is important as shown in Step 214.

In Step 214, the indicated storage node stores the replicated data objects in related storage nodes to the indicated storage node. The copies of the data object are stored in the storage nodes indicated to be used based on the object replication strategy.

The method may end following Step 214.

Returning to the first example in Step 200, the data replication strategy is tailored to keep object replicas within the same sub-cluster (e.g., the first set of storage nodes or the second set of storage nodes). Otherwise, data object replication may be against of the goal of the custom data layout. Therefore, the copies of the data object to be generated for the data object should be kept within the same sub-cluster.

Returning to the second example in Step 200, when the data layout is designed for energy efficiency, replication of the data objects may be workload aware. This replication strategy aims at performing replication during the load transition periods that are common in many services due to factors like human activity (e.g., daily patterns, weekly patterns, etc.). The replication strategy learns from these workload patterns, batches objects to be replicated, and triggers the replication activity to other nodes when the workload is in a transition period, either from low load to high load or high load to low load. Doing replication at these times is beneficial because input/output performance is not impacted due to the workload not being at a peak and these times will not affect the power saving mode of any storage node. Each storage node has a component that maps out the workload pattern to identify the load transition periods. Between load transition periods, each storage node will batch data objects to be replicated. Batching can be implemented via a durable queue with object references that will be consumed at the load transition period. At the load transition period, a replication algorithm will read from the durable queue of data objects to be replicated and start writing copies of the data object to other storage nodes. The replication algorithm may be the standard one of the system, like consistent hashing. If the system requires using additional copies of data objects due to high workload periods, then a randomized distribution of copies of data objects will favor load balancing. The replication strategy may be modified by the user specifying a maximum recovery point objective (RPO). The RPO is maximum acceptable amount of data loss measured in time, representing the point in time to which data can be restored in the event of a failure or disaster. Once the RPO is hit, the replication occurs regardless of the load transition period.

In one or more embodiments, while the Steps above describe whole data objects being stored on storage nodes and having copies generated via simple data replication, the principles above can be extended to a data replication strategy based on erasure coding. The data object may be broken into fragments and stored in target storage nodes using the embedding vector. Parity fragments may then be generated in the target storage nodes and distributed across other storage nodes in keeping with the data replication strategy.

Turning now to FIG. 3, FIG. 3 shows a flowchart for a method for retrieving data in accordance one or more embodiments disclosed herein. The method of FIG. 3 may be performed by, for example, the proxy server (e.g., 100, FIG. 1). Other components of the system of FIG. 1 may perform all, or a portion, of the method of FIG. 3 without departing from the disclosure.

In Step 300, the proxy server receives a retrieval request for a data object from the client. The data object is already stored on the storage system and the client is retrieving the data object. In one or more embodiments, the retrieval request is for a group of data objects and includes a vector embedding or an image related to the group of data objects to be retrieved. Returning to the second example from FIG. 2, the retrieval request may be for data objects stored in a single storage node. The retrieval request is for all images of livers in the storage bucket by providing a vector embedding or an image of a liver to the proxy server.

In Step 302, the proxy server uses the mapping to identify the location of the data object in the storage system. The mapping may be made using the embedding vector in Step 210. The mapping may indicate in which storage node the data object is stored. In one or more embodiments, the mapping is used to find the storage node or group of storage nodes that hold data objects that relate to the vector embedding or the image included in the retrieval request. When the vector embedding is used, a similarity metric may be used to find the correct storage node on the mapping. When the image is used, the embedding model can form a vector embedding then a similarity metric may be used.

In Step 304, the proxy server retrieves the data object from the identified storage node. The mapping indicates which the storage node the data object is located. The proxy server is able to retrieve the data object directly from the identified storage node. In one or more embodiments, if multiple similar data objects are being retrieved at the same time, a data layout strategy that groups similar objects together will reduce the energy consumption of the storage bucket as storage nodes will remain idle in power saving mode if they do not contain the similar data objects.

Returning to example two from Step 200, the proxy server determine that all images of a liver are located in the first storage node. The proxy server retrieves all images of a liver located in the first storage node. Only the first storage node is activated, and all other storage nodes remain idle reducing the energy consumption of the retrieval process.

In Step 306, the proxy server transmits the data object to the client. The data object or data objects retrieved by the proxy server are sent to the client to be received by the user who made the retrieval request.

The method may end following Step 306.

In one or more embodiments, the proxy server may delete data objects from the storage system using the mapping. The proxy server may fulfill a plurality of requests from the client using the steps outlined in FIGS. 2-3.

Start of Example

The following section describes an example. The example, illustrated in FIG. 4, is not intended to limit the disclosure and is independent from any other examples discussed in this application. This example includes only the components necessary to describe the example and other components may be used with the example. Turning to the example, consider a scenario of storing data from a surveillance service. The surveillance service includes data objects such as images (e.g., in commonly used formats such as .jpeg, .png, etc.). Some of the data objects need to be stored securely (e.g., images containing human faces, security cards, license plates on cars, etc.) and other data objects do not need to be stored securely (e.g., images containing empty roads, sides of buildings, etc.). The surveillance service is connected to a system via a client (420) to store the data objects securely or normally. The system includes a proxy server (400), an embedding generator (410), the client (420), a data policy manager (430), and a storage bucket (440). The storage bucket (440) is designed to handle data objects requiring secured storage and data objects not requiring secured storage. The storage bucket includes six storage nodes (e.g., storage node 0 (441A), storage node 1 (441B), storage node 2 (441C), storage node 3 (441D), storage node 4 (441E), and storage node 5 (441F)). Storage node 3 (441D), storage node 4 (441E), and storage node 5 (441F) are secured nodes (445). The secured nodes (445) have specialized security hardware (secured storage). Storage node 1 (441B), storage node 2 (441C), and storage node 3 (441D) do not have specialized security hardware (e.g., normal storage). The storage bucket (440) is part of a larger storage system that includes other storage buckets (not shown) designed for other data storage objectives.

Referring to FIG. 4, prior to the beginning of the example an administrator of the system sets a defined policy for the system. The defined policy defines a data layout for the storage bucket (440) with secured storage and normal storage. The defined policy for the system includes that storage requests for the storage bucket (440) are associated with an embedding model and that storage bucket (440) includes normal storage (storage node 0 (441A), storage node 1 (441B), and storage node 2 (441C)) and secured storage (storage node 3 (441D), storage node 4 (441E), and storage node 5 (441F)). The embedding model is called security and is a machine learning model trained on surveillance data. The embedding model is trained to make an inference if a data object should be stored in secured storage or normal storage. The policy is represented as FOR TENANT "surveillance service" EMBEDDINGS_GENERATOR security STORAGE_NODES [(s0, s1, s2) (s3, s4, s5)]".

At the beginning of the example, the client sends a first storage request for a first data object to the proxy server (400) [1]. The first storage request identifies the storage bucket (440) as the intended storage location for the first data object. The proxy server (400) receives the first storage request. The proxy server (400) searches the data metadata policy manager (430) to determine if the first storage request corresponds with the defined policy [2]. The proxy server (400) makes a first determination that the first storage request corresponds with the defined police due to the first storage request identifying the storage bucket (440).

In response to the first determination, the proxy server (400) transmits the first storage request and the defined policy to the embedding generator (410) [3]. The embedding generator (410) identifies that the embedding model is associated with the defined policy. The embedding generator (410) executes the embedding model to generate an embedding vector. The embedding model uses the content of the first data object as an input to output the embedding vector. The embedding vector determines the storage location of the first data object. The embedding model makes an inference as to whether the first data object requires secured storage. The embedding vector indicates that the first data object is to be stored in one of the secured nodes (445) due to the content of the first data object containing a human face which indicates a need for secured storage [4]. The embedding generator (410) transmits the embedding vector to the proxy server (400).

The proxy server (400) receives the embedding vector for the first data object. The proxy server (400) makes a second determination using a similarity metric on the embedding vector that the first data object is to be stored in one of the secured nodes (445). In response to the second determination, the proxy server (400) makes a third determination that the first data object should be stored in storage node 5 (441F). The third determination is made using consistent hashing of the first data object with the secured nodes (445) as the potential destinations for the first data object. Based on the third determination, the proxy server (400) stores the first data object in storage node 5 (441F) [5].

After the first data object is stored, the first data object is replicated to form copies of the first data object. A copy of the data object is stored in storage node 3 (441D). Storage node 3 (441D) is selected by storage node 5 (441F) because storage node 3 (441D) is a secured node like storage node 5 (441F) [6]. Therefore, the first data object and all copies of the first data object are stored on secured nodes.

Continuing the example, after some time the client sends a second storage request for a second data object to the proxy server (400) [7]. The second storage request identifies the storage bucket (440) as the intended storage location for the second data object. The proxy server (400) receives the second storage request. The proxy server (400) searches the data metadata policy manager (430) to determine if the second storage request corresponds with the defined policy [8]. The proxy server (400) makes a fourth determination that the second storage request corresponds with the defined police due to the second storage request identifying the storage bucket (440).

In response to the fourth determination, the proxy server (400) transmits the second storage request and the defined policy to the embedding generator (410) [9]. The embedding generator (410) identifies that the embedding model is associated with the defined policy. The embedding generator (410) executes the embedding model to generate a second embedding vector. The embedding model uses the content of the second data object as an input to output the second embedding vector. The second embedding vector determines a second storage location of the second data object. The embedding model makes a second inference as to whether the second data object requires secured storage. The second embedding vector indicates that the second data object does not require secured storage and is not to be stored in one of the secured nodes (445) due to the content of the second data object containing only an empty road [10]. The embedding generator (410) transmits the second embedding vector to the proxy server (400).

The proxy server (400) receives the second embedding vector for the second data object. The proxy server (400) makes a fifth determination based on the second embedding vector that the second data object is not to be stored in one of the secured nodes (445). In response to the second determination, the proxy server (400) makes a sixth determination that the first data object should be stored in storage node 0 (441A). The sixth determination is made using consistent hashing of the second data object with the non-secured nodes (e.g., storage node 0 (441A), storage node 1 (441B), storage node 2 (441C)) as the potential destinations for the second data object. Based on the sixth determination, the proxy server (400) stores the second data object in storage node 0 (441A) [11].

After the second data object is stored, the second data object is replicated to form copies of the second data object. A copy of the second data object is stored in storage node 1 (441B). Storage node 2 (441B) is selected by storage node 0 (441A) because storage node 2 (441B) is not a secured node like storage node 0 (441A) [6]. Therefore, the second data object and all copies of the second data object are stored in normal storage.

End of Example

As discussed above, embodiments of the disclosure may be implemented using computing devices. FIG. 5 shows a diagram of a computing device in accordance with one or more embodiments disclosed herein. The computing device may include one or more computer processor(s) (502), non-persistent storage (504) (e.g., volatile memory, such as RAM, cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), input devices (510), output devices (508), and numerous other elements (not shown) and functionalities. Each of these components is described below.

In one embodiment of the disclosure, the processor(s) (502) may be an integrated circuit for processing instructions. For example, the computer processor(s) may be one or more cores or micro-cores of a processor. The computing device may also include one or more input devices (510), such as a touchscreen, keyboard, mouse, microphone, touchpad, electronic pen, or any other type of input device. Further, the communication interface (512) may include an integrated circuit for connecting the computing device to a network (not shown) (e.g., a local area network (LAN), a wide area network (WAN) such as the Internet, mobile network, or any other type of network) and/or to another device, such as another computing device.

In one embodiment of the disclosure, the computing device may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to enable the computer processor to perform one or more embodiments described herein.

The problems discussed above should be understood as being examples of problems solved by embodiments of the disclosure disclosed herein and the disclosure should not be limited only to solving the same/similar problems. The disclosure is broadly applicable to address a range of problems beyond those discussed herein.

Specific embodiments are described with reference to the accompanying figures. In the above description, numerous details are set forth as examples. It will be understood by those skilled in the art, that one or more embodiments of the present disclosure may be practiced without these specific details, and that numerous variations or modifications may be possible without departing from the scope. Certain details known to those of ordinary skill in the art are omitted to avoid obscuring the description.

In the prior description of the figures, any component described with regard to a figure, in various embodiments of the disclosure, may be equivalent to one or more like-named components described with regard to any other figure. For brevity, descriptions of these components are not repeated with regard to each figure. Thus, each and every embodiment of the components of each figure is incorporated by reference and assumed to be optionally present within every other figure having one or more like-named components. Additionally, in accordance with various embodiments of the disclosure, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N unless otherwise specified. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

Software instructions in the form of computer readable program code to perform embodiments described herein may be stored, in whole or in part, temporarily or permanently, on a non-transitory computer readable medium such as a CD, DVD, storage device, a diskette, a tape, flash memory, physical memory, or any other physical computer readable storage medium. Specifically, the software instructions may correspond to computer readable program code that, when executed by a processor(s), is configured to perform one or more embodiments described herein.

While the disclosure has been described above with respect to a limited number of embodiments, those skilled in the art, having the benefit of this disclosure, will appreciate that other embodiments can be devised which do not depart from the scope as disclosed herein. Accordingly, the scope of the disclosure should be limited only by the attached claims.

What is claimed is:

1. A method for storing data, comprising:

receiving, from a client, at a proxy server, a storage request to store a data object in a storage system, wherein the storage system comprises at least one storage bucket with a group of storage nodes;

determining that the data object is associated with a defined policy based on the storage request, wherein:

the defined policy is set prior to the storage request, the storage request identifies the data object is to be stored in a first storage bucket that comprises a first set of storage nodes comprising storage nodes comprising servers with specialized security hardware and a second set of storage nodes comprising storage nodes comprising servers without specialized security hardware which corresponds to the defined policy, and the defined policy identifies a first embedding model in an embedding generator;

after determining the data object is associated with the defined policy, generating, by the first embedding model identified in the defined policy, an embedding vector using content of the data object as an input, wherein the content of the data object requires secure storage which is indicated by the embedding vector providing context provided by content of the data object;

receiving, from the embedding generator, the embedding vector for the data object, wherein the embedding vector includes instructions to store the data in a first storage node of the first set of storage nodes with the specialized security hardware based on a similarity search of the embedding vector indicating a vector ID space of a first storage node;

based on the embedding vector, storing the data object in the first storage node of the first set of storage nodes, wherein:

a mapping of the data object to the first storage node is stored in the proxy server, and the first storage node comprises a first server with the specialized security hardware;

replicating the data object in the first storage node to create copies of the data object; and storing the copies of the data object in at least a second storage node of the first set of storage nodes, wherein:

the second storage node comprises a second server with the specialized security hardware, a second mapping of the copies of the data object to the second storage node is stored in the proxy server.

2. The method of claim 1, further comprising:

receiving, at the proxy server, a second storage request to store a second data object in the storage system;

determining that the second data object is associated with the defined policy based on the second storage request, wherein:

the storage request identifies the data object is to be stored in the first storage bucket, and the second storage request identifies the first embedding model in the embedding generator;

after determining the second data object is associated with the defined policy, generating, by the first embedding model identified in the defined policy, a second embedding vector using second content of the second data object as an input, wherein the second content of the second data object requires secure storage;

receiving, from the embedding generator, the second embedding vector for the second data object, wherein the second embedding vector includes instructions to store the second data object in a fourth storage node, the fourth storage node comprising a fourth server; and based on the embedding vector, storing the second data object in the fourth storage node, wherein a second mapping of the second data object to the fourth storage node is stored in the proxy server.

3. The method of claim 2, further comprising:

replicating the second data object in the fourth storage node to create copies of the second data object; and storing the copies of the second data object at least in a fifth storage node and a sixth storage node, wherein:

the fourth storage node comprises a fourth server, the fifth storage node comprises a fifth server, and a fourth mapping of the copies of the second data object to the fifth storage node and the sixth storage node is stored in the proxy server.

4. The method of claim 1, further comprising:

receiving, by the client, at a proxy server, a retrieval request for the data object in the storage system;

using the mapping in the proxy server to identify a location of the data object in the first storage node;

based on the mapping, retrieving the data object in the first storage node; and after retrieving the data object, transmitting the data object to the client.

5. The method of claim 1, wherein the first embedding model is a convolutional neural network and generates the embedding vector based on images of the data object.

6. The method of claim 1, wherein the data object is placed in the first storage node of the first set of storage nodes by applying a ring in the proxy server for consistent hashing in the first set of storage nodes after receiving instructions to store the data in the first set of storage node.

7. The method of claim 1, further comprising:

generating a multitude of parity fragments of the data object in the first storage node; and storing the multitude of parity fragments of the data object at least in a second storage node and a third storage node of the first set of storage nodes, wherein:

the second storage node comprises a second server with the specialized security hardware, and the third storage node comprises a third server with the specialized security hardware.

8. A method for storing data, comprising:

receiving, from a client, at a proxy server, a storage request to store a data object in a storage system, wherein the storage system comprises at least one storage bucket with a group of storage nodes;

determining that the data object is associated with a defined policy based on the storage request, wherein:

the defined policy is set prior to the storage request, the storage request identifies the data object is to be stored in a first storage bucket that comprises a first set of storage nodes, each storage node of the first set of storage nodes is related to an associated group of data objects which corresponds to the defined policy, and the defined policy identifies a first embedding model in an embedding generator;

after determining the data object is associated with the defined policy, generating, by the first embedding model identified in the defined policy, an embedding vector using content of the data object as an input;

receiving, from the embedding generator, the embedding vector for the data object, wherein the embedding vector includes instructions to store the data object in a first storage node which is related to the associated group of data objects including the data object based on a similarity search of the embedding vector indicating a vector ID space of a first storage node, wherein the vector ID is created by the embedding vector from context provided by content of the data object;

based on the embedding vector, storing the data object in the first storage node, wherein a mapping of the data object to the first storage node is stored in the proxy server;

replicating the data object in the first storage node to create copies of the data object; and storing the copies of the data object in at least a second storage node of the first set of storage nodes, wherein a second mapping of the copies of the data object to the second storage node is stored in the proxy server.

9. The method for claim 8, comprising:

receiving, at a proxy server, a retrieval request for the data object in the storage system;

using the mapping in the proxy server to identify a location of the data object in the first storage node;

based on the mapping, retrieving the data object in the first storage node, wherein only the first storage node that contains the data object is activated and other storage nodes are in a power saving mode during the retrieval of the data object; and transmitting the data object to the client.

10. The method of claim 8, further comprising:

making a first determination that a load transition period is occurring in the storage system, wherein the load transition period is a time that the storage system is moving from low load to high load or high load to low load;

based on the first determination, replicating the data object in the first storage node to create copies of the data object; and storing the copies of the data object at least in a second storage node and a third storage node of the storage system, wherein a second mapping of the copies of the data object to the second storage node and the third storage node is stored in the proxy server.

11. The method of claim 8, further comprising:

making a first determination that a load transition period is occurring in the storage system, wherein the load transition period is a time that the storage system is moving from low load to high load or high load to low load;

based on the first determination, generating a multitude of parity fragments of the data object in the first storage node; and storing the multitude of parity fragments of the data object at least in a second storage node and a third storage node of the storage system, wherein a second mapping of the multitude of parity fragments of the data object to the second storage node and the third storage node is stored in the proxy server.

12. The method of claim 8, wherein the first embedding model is a convolutional neural network and generates the embedding vector based on images of the data object.

13. A non-transitory computer readable medium (CRM) comprising computer readable program code, which when executed by a computer processor enables the computer processor to perform a method for storing data, the method comprising:

receiving, from a client, at a proxy server, a storage request to store a data object in a storage system, wherein the storage system comprises at least one storage bucket with a group of storage nodes;

determining that the data object is associated with a defined policy based on the storage request, wherein:

the defined policy is set prior to the storage request, the storage request identifies the data object is to be stored in a first storage bucket that comprises a first set of storage nodes comprising storage nodes comprising servers with specialized security hardware and a second set of storage nodes comprising storage nodes comprising servers without specialized security hardware which corresponds to the defined policy, and the defined policy identifies a first embedding model in an embedding generator;

after determining the data object is associated with the defined policy, generating, by the first embedding model identified in the defined policy, an embedding vector using content of the data object as an input, wherein the content of the data object requires secure storage which is indicated by the embedding vector providing context provided by content of the data object;

receiving, from the embedding generator, the embedding vector for the data object, wherein the embedding vector includes instructions to store the data in a first storage node of the first set of storage nodes with the specialized security hardware based on a similarity search of the embedding vector indicating a vector ID space of a first storage node;

based on the embedding vector, storing the data object in the first storage node of the first set of storage nodes, wherein:

a mapping of the data object to the first storage node is stored in the proxy server, and the first storage node comprises a first server with the specialized security hardware;

replicating the data object in the first storage node to create copies of the data object; and storing the copies of the data object in at least a second storage node of the first set of storage nodes, wherein:

the second storage node comprises a second server with the specialized security hardware, a second mapping of the copies of the data object to the second storage node is stored in the proxy server.

14. The non-transitory CRM of claim 13, further comprising:

receiving, at the proxy server, a second storage request to store a second data object in the storage system;

determining that the second data object is associated with the defined policy based on the second storage request, wherein:

the storage request identifies the data object is to be stored in the first storage bucket, and the second storage request identifies the first embedding model in the embedding generator;

after determining the second data object is associated with the defined policy, generating, by the first embedding model identified in the defined policy, a second embedding vector using second content of the second data object as an input, wherein the second content of the second data object requires secure storage;

receiving, from the embedding generator, the second embedding vector for the second data object, wherein the second embedding vector includes instructions to store the second data object in a fourth storage node, the fourth storage node comprising a fourth server; and based on the embedding vector, storing the second data object in the fourth storage node, wherein a second mapping of the second data object to the fourth storage node is stored in the proxy server.

15. The non-transitory CRM of claim 14, further comprising:

replicating the second data object in the fourth storage node to create copies of the second data object; and storing the copies of the second data object at least in a fifth storage node and a sixth storage node, wherein:

the fourth storage node comprises a fourth server, the fifth storage node comprises a fifth server, and a fourth mapping of the copies of the second data object to the fifth storage node and the sixth storage node is stored in the proxy server.

16. The non-transitory CRM of claim 13, further comprising:

receiving, by the client, at a proxy server, a retrieval request for the data object in the storage system;

using the mapping in the proxy server to identify a location of the data object in the first storage node;

based on the mapping, retrieving the data object in the first storage node; and after retrieving the data object, transmitting the data object to the client.

17. The non-transitory CRM of claim 13, wherein the data object is placed in the first storage node of the first set of storage nodes by applying a ring in the proxy server for consistent hashing in the first set of storage nodes after receiving instructions to store the data in the first set of storage node.

18. The non-transitory CRM of claim 13, further comprising:

generating a multitude of parity fragments of the data object in the first storage node; and storing the multitude of parity fragments of the data object at least in a second storage node and a third storage node of the first set of storage nodes, wherein:

the second storage node comprises a second server with the specialized security hardware, and the third storage node comprises a third server with the specialized security hardware.

\* \* \* \* \*